W. T. HOOFNAGLE.
DRYING APPARATUS.
APPLICATION FILED APR. 15, 1912.
1,043,011.
Patented Oct. 29, 1912.
2 SHEETS—SHEET 2.
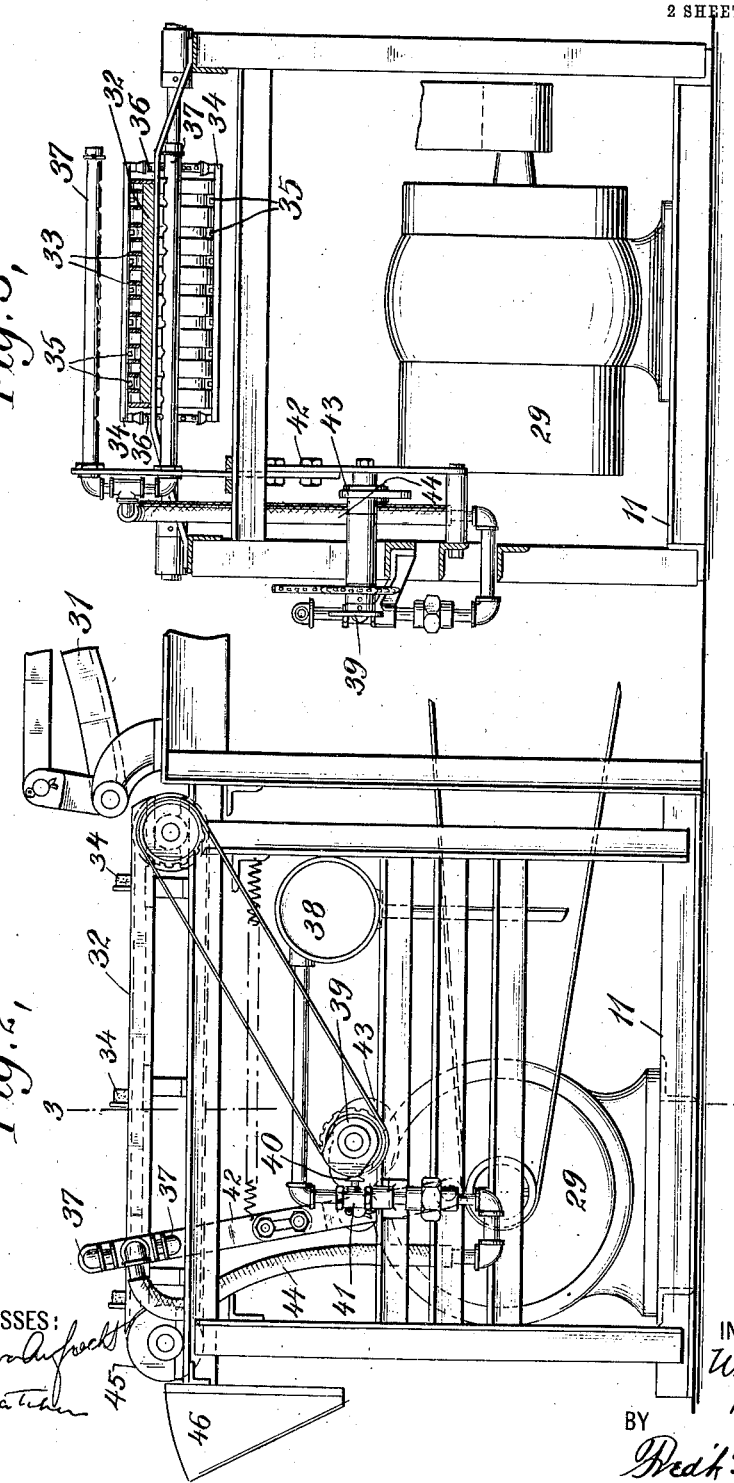

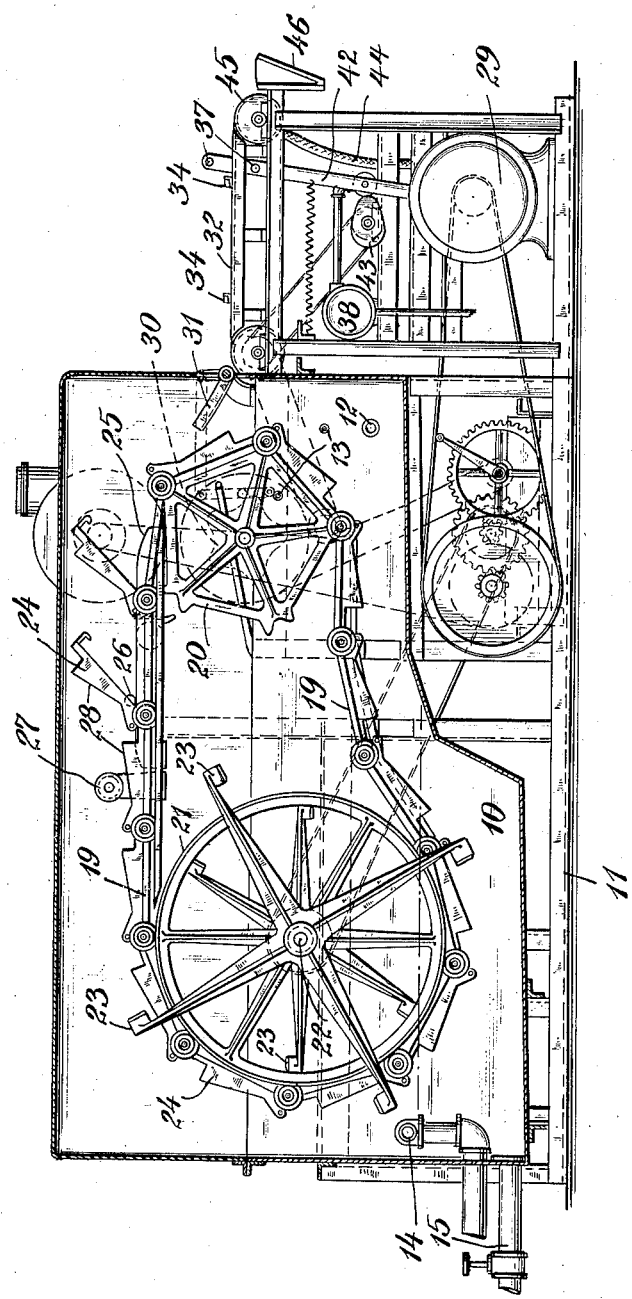

UNITED STATES PATENT OFFICE.

WILLIAM T. HOOFNAGLE, OF GLEN RIDGE, NEW JERSEY, ASSIGNOR TO CHARLES F. FROTHINGHAM, OF NEW YORK, N. Y.

DRYING APPARATUS.

1,043,011.  Specification of Letters Patent.  Patented Oct. 29, 1912.

Original application filed March 18, 1912, Serial No. 684,540. Divided and this application filed April 15, 1912. Serial No. 690,800.

*To all whom it may concern:*

Be it known that I, WILLIAM T. HOOFNAGLE, a citizen of the United States, and a resident of Glen Ridge, in the county of Essex and State of New Jersey, have invented certain new and useful Improvements in Drying Apparatus, of which the following is a specification.

The invention relates to machines for washing dishes and the like; and is a division of an application filed by me on the 18th day of March, 1912, and bearing the Serial No. 684,540, and in which the same is shown and described, but not specifically claimed.

It relates more particularly to means for insuring the drying of the dishes after the same have been washed, and to this end consists in directing air under high pressure toward the dishes, which may be advanced as by means of a suitable carrier, whereby any adhering particles of water will be physically removed and the dish dried thereby as well as by the evaporating effect of the said air.

The invention consists, furthermore, in certain novel features of construction, whereby the air is only periodically directed toward the dishes, being properly timed to the movement of the same, and in such a manner as to provide for a sweeping effect.

The nature of the invention will best be understood when described in the accompanying drawings, in which—

Figure 1 is a front elevation of a dish washing machine and the improved drying apparatus employed in connection therewith, the washing tank of the machine being shown in section. Fig. 2 is an enlarged rear elevation of the drying apparatus. Fig. 3 is a section taken on the line 3—3, Fig. 2.

Similar characters of reference designate corresponding parts throughout the several views.

Referring to the drawings, 10 designates the washing tank, which is mounted on a suitable base 11; and contains the washing water fed thereto through a suitable inlet 12 in a higher section of the tank, as well as through suitable spray pipes 13. The water thus introduced runs into the lower or washing tank proper, where its level is maintained through an overflow 14. A clean-out pipe 15 is also provided at the base of the tank.

The dishes are arranged to be carried through the water in the lower portion of the tank by an endless belt 19, driven by sprockets 20, and passing over rollers 21 loosely mounted upon a shaft 22; and are washed therein through the action of suitable paddles 23. The said belt 19 is composed of a plurality of dish retaining means or baskets 24, which are arranged to be periodically opened by a cam 25 and a roller 26 to enable the dishes to be inserted, whereupon the baskets are closed by a roller 27 bearing upon a cam surface 28 of the baskets. The sprockets 20 are driven through intermediate mechanism from a motor 29, which drives also a cam 30 actuating a take-off frame or bridge 31 following the motion of the baskets to remove the dishes from the endless belt as the same are presented. Cam 30, after its frame has delivered a dish, raises the said frame to such an extent that the succeeding basket and its dish may pass, whereupon the take-off frame drops, through the action of the cam, again to its initial position to receive the next dish. From the take-off frame 31, the dish slides by gravity upon the table 32, which is composed of a plurality of longitudinal strips 33, preferably of wood. These strips are suitably separated to permit air to be blown therethrough, as well as to allow the passage thereover of push rods 34 having extensions or guides 35 projecting into the spaces between the strips 33. The push rods are mounted upon an endless chain driven through suitable sprockets 36 at the side of the table, which sprockets are actuated through intermediate mechanism from the motor 29. As the dishes are moved over this table, through the action of the push rods 34, they encounter toward the farther end of said table a stream or streams of air under high pressure directed thereto from perforated pipes 37 embracing the said table. The air is directed only at the times a dish is arranged to be in position, the supply of air being controlled from a tank 38 through the action of a cam 39 on a spring pressed valve stem 40 of a valve 41. The air pipes are arranged, furthermore, to sweep across the table 32 in a direction opposed to the direction of travel of a dish, and at a considerably greater speed than the travel of said dish. This effects great economy of the air and also provides for the forcible removal of particles of water which may have adhered to the dish, thus completely drying the same. The oscillation of the air pipes is effected by mounting the same on spring drawn pivoted arm 42 controlled through the action of a cam 43, driven through intermediate mechanism from the motor 29; and the direction of the air is preferably such as to strike the table at a slight angle, thereby insuring a sweeping action. A hose connection 44 is included between the air pipes and the controlling valve to permit of the oscillation of the said air pipes. After leaving the table, the dishes pass over a roller 45 and into a delivery trough 46.

Although a table and movable push rods are shown to advance the dishes, yet I do not desire to restrict myself to this particular manner of presenting a dish to the air.

I claim:—

1. Drying apparatus, comprising: means to simultaneously direct air to both sides of an article to be dried; and means to periodically supply air under pressure to said air directing means.

2. Drying apparatus, comprising: a perforated U-shape pipe; a valve device controlling the supply of air to the said U-shape pipe; and a cam adapted to periodically actuate said valve device to supply air to the said U-shape pipe.

3. Drying apparatus, comprising: a suitable table; means to move the articles to be dried over said table; a perforated U-shape pipe embracing a portion of said table; a valve device controlling the supply of air to said U-shape pipe; and a cam timed to the movement of the articles over said table and adapted to periodically actuate said valve device to supply air to the said U-shape pipe.

4. Drying apparatus, comprising: means to direct air to an article to be dried; means to periodically supply air under pressure to said air directing means; and means to oscillate said air directing means.

5. Drying apparatus, comprising: a suitable table; means to move the articles to be dried over said table; means to direct air toward an article when it arrives at a particular portion of the table; and means to move said air directing means over the article in a direction counter to the movement of the said article and to then return the said air directing means.

6. Drying apparatus, comprising: a suitable table; means to move the articles to be dried over said table; means to direct air toward an article when the same arrives at a particular portion of the table; and a cam timed to the movement of the article over said table to oscillate the said air directing means.

7. Drying apparatus, comprising: a suitable table; means to move the articles to be dried over said table; a perforated U-shape pipe embracing a portion of said table; a valve device controlling the supply of air to said U-shape pipe; a cam timed to the movement of the articles over said table and adapted to periodically actuate said valve device to supply air to the U-shape pipe; and a cam timed to the movement of the articles over said table to oscillate the said air directing means.

8. Drying apparatus, comprising: a perforated U-shape pipe; a valve device controlling the supply of air to said U-shape pipe, and means to periodically actuate the said valve device to supply air to said U-shape pipe; a flexible hose connection between said U-shape pipe and the said valve device; a pivoted spring drawn arm carrying said U-shape pipe; and a suitably driven cam engaging said arm.

9. Drying apparatus, comprising: a table consisting of a plurality of longitudinal strips of suitable material, separated from one another, to receive the articles to be dried; means to move said articles over said table; means embracing said longitudinal strips transversely to their length; and means to supply air under pressure thereto.

10. Drying apparatus, comprising: a table consisting of a plurality of longitudinal strips of suitable material, separated from one another, to receive the articles to be dried; a plurality of suitably spaced push rods, and means to advance the same over said table to move the said articles thereover; means embracing said longitudinal strips transversely to their length; and means to supply air under pressure thereto.

Signed at New York, in the county of New York, and State of New York, this 13th day of April A. D. 1912.

WILLIAM T. HOOFNAGLE.

Witnesses:
 LAURA E. SMITH,
 FREDK. F. SCHUETZ.